Patented Sept. 22, 1925.

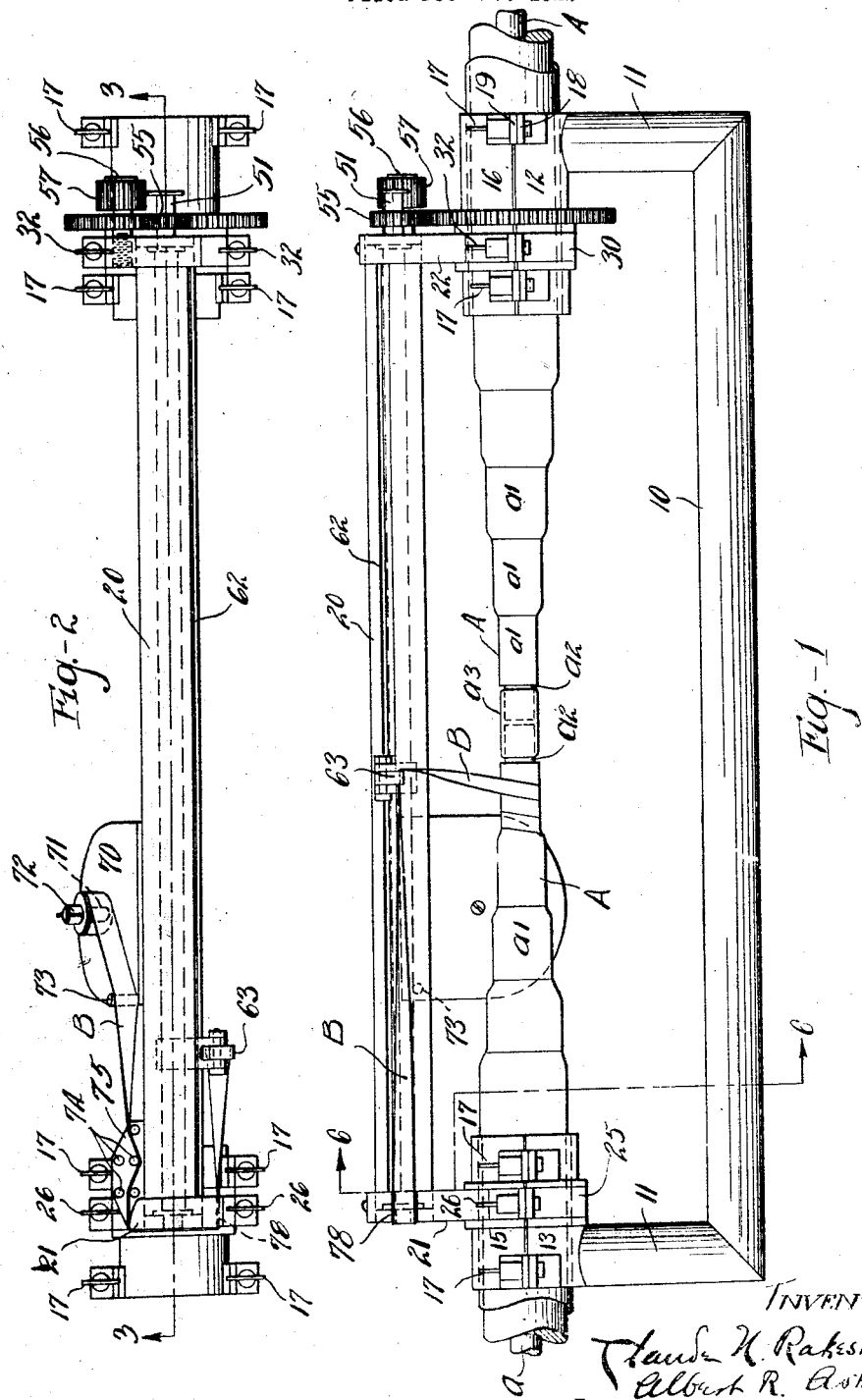

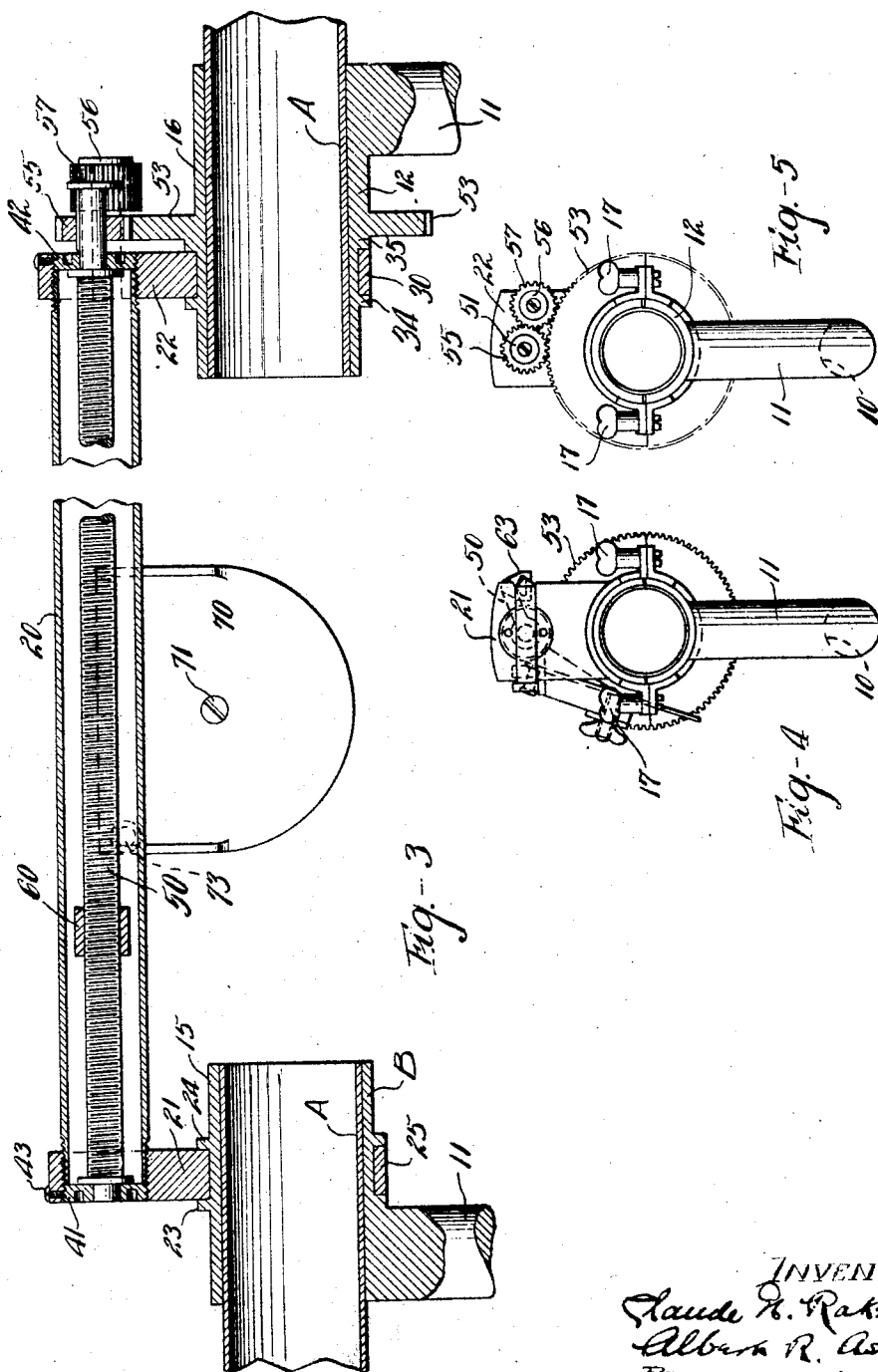

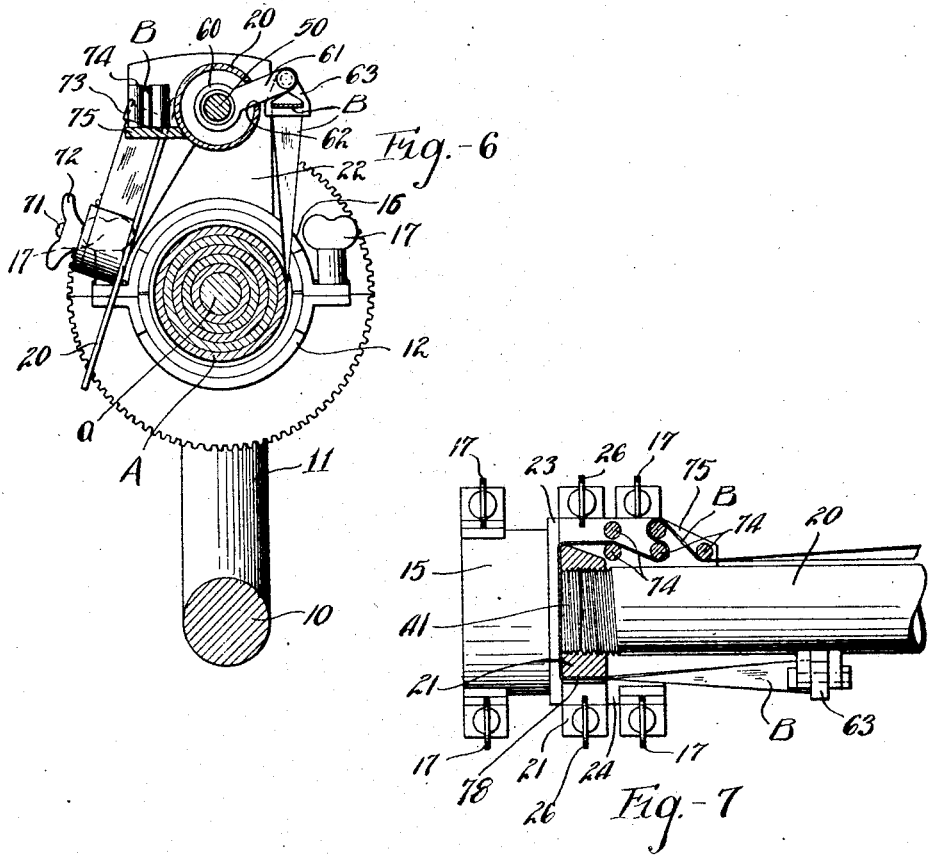
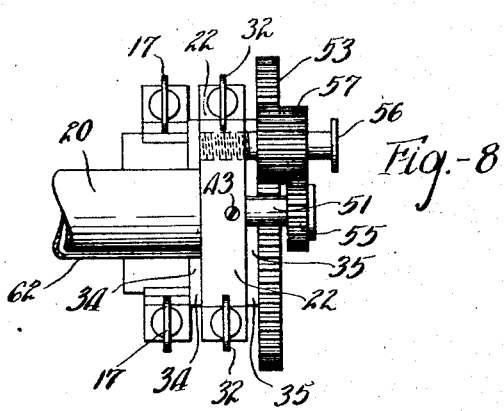

1,554,294

UNITED STATES PATENT OFFICE.

CLAUDE N. RAKESTRAW, OF LAKEWOOD, AND ALBERT R. ASKUE, OF EAST CLEVELAND, OHIO.

DEVICE FOR WINDING INSULATION ON ELECTRIC JOINTS.

Application filed December 26, 1922. Serial No. 608,874.

*To all whom it may concern:*

Be it known that we, CLAUDE N. RAKESTRAW and ALBERT R. ASKUE, citizens of the United States, residing at Lakewood, Ohio, and East Cleveland, Ohio, respectively, in the county of Cuyahoga and State of Ohio, have invented a certain new and useful Improvement in a Device for Winding Insulation on Electric Joints, of which the following is a full, clear, and exact description, reference being had to the accompanying drawings.

This invention relates to mechanism for winding an insulating tape under proper tension over the joint of electric conductors. When electric cables are joined together, it is customary to remove the insulation and suitably connect the conducting members and thereafter to wind over the joint manually an insulating tape. With underground cables, particularly those carrying high tension current, much difficulty has been experienced by reason of air and moisture being entrapped within the applied winding, due to the lack of proper tension on the tape as it is wound as well as to the irregularities incident to manual operation.

Our invention is designed to avoid the difficulty mentioned by means of a mechanical device which maintains the insulating tape under proper tension at all times and winds it with a uniform overlap alternately in opposite directions as desired. Our invention is hereinafter more fully described in connection with the drawings, which show a simple embodiment of it, and the essential features are summarized in the claims.

In the drawings, Fig. 1 is a view of our invention as applied in use for insulating the joint of a single core cable. This view may be considered an elevation. Fig. 2 is a plan of the structure shown in Fig. 1; Fig. 3 is a longitudinal section as indicated by the line 3—3 on Fig. 2; Fig. 4 is an end elevation looking from the left hand end of Fig. 1; Fig. 5 is an end elevation looking from the right hand end of Fig. 1; Fig. 6 is a cross section on a larger scale than the preceding views and taken on an offset plane, as indicated by the line 6—6 on Fig. 1; Fig. 7 is a fragmentary longitudinal section through the tension mechanism shown as adjacent to the left hand end of the machine; Fig. 8 is a detail of the reversing mechanism shown as located adjacent to the right hand end of Figs. 1 and 2.

In Fig. 1, we have illustrated two meeting cable sections A, A, the joint of which is being wound with our apparatus. The cable sections are shown as having a single central core $a$ covered with successive layers of insulation $a'$. In accordance with ordinary practice, this insulation is striped back in successive steps, as shown, and the bare-ends $a^2$ of the care are abutted and covered by a metal sleeve $a^3$ which is soldered to the core. Our device is designed to wind the insulating tape uniformly and with proper tension over such connected core, to replace effectively the original insulation which was removed to make the connection.

The frame of our device comprises a yoke 10 adapted to be clamped to the two cable sections. As shown, this yoke comprises a longitudinal bar having inwardly projecting arms 11 which terminate in longitudinal semi-cylindrical portions 12 and 13. Cooperating with these semi-cylindrical members are semi-cylindrical caps 15 and 16 adapted to form with split sleeves to clamp about the cable. The clamping is shown as effected by suitable wing nuts 17 which screw onto bolts 18 passing through outstanding ears 19 on each member of the sleeve clamp.

The removal of the cap portions of the clamping sleeves allows the yoke to be placed in proper position against the two cable sections either before or after the ends of the core are connected and then the replacement of the caps and the turning down of the wing nuts rigidly clamps the yoke to the cable sections.

The insulating tape, designated B in Figs. 1, 2, 6 and 7, is carried by a flier frame mounted on the two clamping sleeves carried by the yoke. This flier frame is adapted to make complete rotations about the cable, swinging within the opening of the yoke and thus wind the tape thereon. As hereinafter explained, the flier frame carries a reciprocating guide for the tape, so that it is laid spirally, first in one direction and then in the other.

The flier frame, as shown, comprises a longitudinal tube 20 rigidly mounted at its ends in a pair of arms 21 and 22 which are journaled on the clamping sleeves of the yoke; as shown, the members 13 and 15 of the split sleeve at one end carry semi-circular ribs 23 and 24 which make a complete annular channel in which the arm 21 is journaled. This arm has a removable semi-cylindrical cap 25 held to it by wing nuts 26; the removal of the wing nuts separates the cap and thus the flier frame arm may be journaled on the yoke sleeve after the latter is clamped to the cable. Similarly, at the other end of the yoke the flier frame arm 22 is provided with a removable cap 30 adapted to be clamped to it by a wing nut 32 and each of the sleeves 12 and 16 have arcuate ribs 34 and 35 forming an annular channel for the arm 22.

The tubular longitudinal member 20 of the flier frame is shown as screw threaded into the arms 21 and 22, and beyond the ends of the tube and mounted within these arms are shown bearing nuts 41 and 42 which are shown as locked in place by the set screws 43. Journaled within the bearing nuts is a longitudinal lead screw 50 which controls the travel of the insulating tape as hereinafter explained. The shank of the lead screw 51 extends through the bearing nut 42 and is suitably geared with a stationary gear 53 carried by the yoke clamp at that end. The stationary gear is a two part member separable diametrically, one half being rigidly carried by the member 12 of the clamp and the other half by the member 16.

The construction described causes the lead screw 50 to rotate on its axis as the flier frame is revolved about the axis of the yoke. The gearing connecting the lead screw with the stationary gear 53 is changeable at will to reverse the direction of the lead screw to cause the tape to change from a right to a left spiral as desired. Any suitable reversing gearing may be employed for this purpose.

We have shown a simple arrangement of sliding pinions for reversing the direction of the lead screw. As shown, a pinion 55 is slidably mounted on the shaft 51 of the screw and may mesh with the teeth of the stationary gear 53. The arm 22 carries a stud 56 at the side of the screw extension 51 and on this stud is slidably mounted a wide pinion 57 which may mesh with both the gear 53 and the pinion 55 (as shown in Fig. 8) or may be drawn lengthwise toward the right to pass out of mesh with the gear 53. In this position this wide pinion will also clear the pinion 55 when it is in mesh with the gear 53. Accordingly, to drive the screw in one direction the pinion 55 is shoved toward the left into mesh with the stationary gear and the pinion 57 is drawn to the right out of engagement with the pinion and gear. To reverse the direction, the opposite shifting takes place and the pinion 55 is drawn out of mesh with the gearing 53 and the pinion 57 shoved into mesh with that gear while maintaining its mesh with the pinion 55. If desired, any suitable shifting mechanism may be employed for giving this alternate movement to the two pinions as desired, or the shifting may be done manually without special mechanism.

It will be seen from the construction described that as the flier frame rotates about the abutted and connected core, the screw will rotate first in one direction and then in the other according to the shifting of the reversing gearing. Now, we provide on that screw a nut 60 which controls the laying of the insulating tape B. This nut has an arm 61 extending radially through a slot 62 in the tube 20. The insulating tape passes through a guide 63 which is shown as a stirrup pivoted to the end of the arm 61. The supply of insulating tape is suitably carried by the tube 20 and is threaded through a tension mechanism to be described and thence through the stirrup 63 from whence it passes onto the cable.

The support for the roll of insulating tape is shown as comprising a plate 70 rigidly secured to the tube 20 and carrying a stud 71 on which the roll of tape is mounted, this stud preferably having a wing nut 72 and washer by which the tape is freely retained in position. The tape passes from its roll first across a guide pin 73 carried by the plate 70 and thence across various pins 74 on a plate 75 carried by the tube. A number of these latter pins are provided and the proper tension is given to the tape by its being weaved in or out in contact with the desired number of these pins. In Fig. 2 we have shown the tape in contact with three pins 74, while in Fig. 7 it contacts with four of these pins, thus giving it a greater tension. If still greater tension is required, it may be wound about the remaining pin shown as idle in Fig. 7. This gives a simple device for providing a choice of tensions on the tape.

Of course the number of pins of the tension device may be varied as desired, or a different form of tension device may be employed. After leaving the tension device the tape passes across the outer face of the arm 21 and thence along a recess 78 in the side of the arm and thence through the guiding stirrup 63 heretofore mentioned, to the cable.

In the construction described after the yoke is clamped on the abutted and connected cables, the flier frame is put in place with the tape threaded as described and the end of the tape brought into contact with the cable on one side of the joint and the shiftable gearing set to cause the nut to travel toward the other cable section. Then as the flier frame is rotated manually the tape is wound over the cable spirally at a pitch determined by the pitch of the screw and the gearing, the nut gradually traveling toward the opposite end of the device. In this operation the tension maintained in the tape causes it to pull tightly about the cable, thus exclude the air and moisture between it and the cable.

After one layer of insulation has been laid for the desired distance, the reversing gearing is shifted and the continued movement of the flier frame lays the tape spirally in the opposite direction. Successive layers are laid for the same or a different distance as may be necessary to fill up the space originally occupied by the removed insulation.

Ordinarily the tape will be applied at the start adjacent the joint and the nut will be given a short travel of one or more strokes to fill up the space originally occupied by the innermost layers of insulation. This will bring the exterior of the tape applied in this region substantially flush with the adjacent steps of the original insulation. Then as the next layer of tape is applied the spiral is extended before the reversal takes place to overlap the next layer of original insulation and this extent of application is continued as may be necessary to fill up the intervening space, and so on. Thus the applied layers of insulation are gradually extended in length in each direction until at the end of the operation the entire space is filled up smoothly with insulating tape, the exterior of which is flush with the exterior of the outermost layer of original insulation.

Following the completion of the winding operation, the flier frame is removed and the yoke sleeves unclamped and the yoke is removed. It will be seen that the winding apparatus may be easily applied and may be operated rapidly to lay the insulation and that the insulation is laid regularly and with such tension as may be necessary to exclude the air moisture. The yoke also, besides carrying the flier frame as the further advantage of maintaining the cable sections rigidly in perfect alignment during the winding operation. At the completion of such operation, if armor is desired over the wound tape, it may be applied in the usual manner.

Having thus described our invention, we claim:—

1. A device for winding insulating tape over cable joints comprising means for clamping the cable on opposite sides of the joint and holding it with its two ends rigid with reference to each other, mechanism rotatably mounted on said means and operative to pass the tape around the cable and over the joint and feeding the tape spirally while maintaining proper tension on it, and while maintaining it flat.

2. In a device of the character described, the combination of a flier frame, means for mounting it concentrically of the axis of two connected cable sections, a supply of insulating tape on the flier frame, and means for guiding said tape from an intermediate point on one side of the frame around the end thereof to an intermediate point on the opposite side and maintaining it flat throughout such course.

3. The combination of a yoke adapted to be clamped to connected cable sections respectively on opposite sides of the joint, and a revolving device mounted on said yoke and adapted to swing within it for winding insulating tape onto the cables.

4. The combination of a yoke having means adapted to embrace cable sections respectively on opposite sides of the joint thereof, a flier frame mounted on said embracing means, and means on the flier frame for guiding a tape to be wound by it on the cable.

5. The combination of a yoke adapted to be clamped to cable sections respectively on opposite sides of the joint thereof, a flier frame mounted on the yoke, a traveling guide on the flier frame for feeding tape spirally about the cable first in one direction and then in the other.

6. The combination of a yoke adapted to be clamped to cable sections respectively on opposite sides of the joint thereof, a flier frame mounted on the yoke, means on the flier frame for carrying tape to be wound by it on the cable, a traveling guide on the flier frame for feeding the tape first in one direction and then in the other, and a tension device for said tape mounted on the flier frame.

7. The combination of a yoke provided with two separate clamps adapted to engage cable sections on opposite sides of the joint, a flier frame revolubly mounted on said clamps, means on the flier frame for carrying a tape, means for causing such tape to traverse the cable in either direction, and means for changing the direction of traverse.

8. The combination of a flier frame mounted to revolve about connected cable sections, a screw carried by the flier frame, a nut movable longitudinally by the screw, means on the flier frame for carrying a tape, means on the nut for guiding such tape, and an adjustable tension device operating on the tape between its supply and said guide.

9. The combination of a flier frame adapted to be mounted to revolve about the axis of two aligned cables, a screw carried by the frame parallel with the cables, a nut longitudinally movable by the screw, means on the flier frame for supporting a roll of tape, a guide for said tape carried by the nut and means for directing the tape from its supply over the end of the screw and along the same, whence it may pass through the guide to the cable.

10. The combination of a pair of clamps adapted to be secured to connected cable sections on opposite sides of the joint, a flier frame journaled on said clamps, a lead screw carried by the flier frame, a stationary gear carried by one of the clamps, gearing between said stationary gear and the lead screw, and means for laying the tape spirally controlled by the lead screw.

11. The combination of a yoke having a pair of separated split sleeve clamps, a flier frame removably journaled on said clamps, and means carried by the flier frame for laying a tape spirally in either direction on the cable.

12. The combination of a yoke having a pair of split sleeve clamps, a flier frame having arms adapted to be removably journaled on said clamps, a lead screw carried by the flier frame, a stationary gear on one of the clamps, gearing between it and the lead screw, a nut for the screw and a guide for the tape carried by the nut.

13. The combination of a yoke carrying a pair of split sleeve clamps, means for causing said clamps to embrace a pair of aligned cable sections, a flier frame having arms adapted to removably embrace the split sleeve clamps and be journaled thereon, a longitudinal screw carried by the flier frame, a stationry gear carried by one of the clamps, gearing between said gear and the screw, a traveling nut mounted on the screw and carried by the flier frame, a guide for the tape carried by the nut, and a support and tension device for the tape carried by the flier frame.

14. The combination of a flier frame journaled to revolve about connected cable sections on opposite sides of the joint, and having a longitudinally split tube, a revoluble screw within the tube, a nut on the screw, a member extending from the nut through the slot in the tube, a tape-guide on said member exterior to the tube, and means for rotating the screw as the flier frame revolves.

15. The combination of a pair of members adapted to surround connected cable sections on opposite sides of the joint, a flier frame journaled on said members and having a longitudinally split tube, a screw within the tube, a nut on the screw, a member extending from the nut through the slot in the tube, a tape guide on said member exterior to the tube, means for rotating the screw as the flier frame revolves, and means operable at will for changing the direction of rotation of the screw.

16. The combination of a yoke having a pair of split sleeves adapted to clamp about connected cable sections on opposite sides of the joint, a flier frame journaled on said sleeves and having a longitudinally split tube, a screw within the tube, a nut on the screw, a member extending from the nut through the slot in the tube, a tape-guide on said member exterior to the tube, means for rotating the screw as the flier frame revolves, means operable at will for changing the direction of rotation of the screw, means carried by said flier frame for supporting a roll of insulating tape, and a tension device carried by the flier frame, the tape passing from said support through the tension device over the end of the tube and through the tape guide to the cable.

17. In a device for winding tape on cable joints, the combination of a revoluble frame, a longitudinal traveling guide mounted thereon, means on the frame for carrying a supply of tape, and means for guiding said tape from the supply around the end of the frame to the traveling guide.

18. In a device of the character described, the combination of a flier frame carrying a longitudinal screw, a traveling guide having a nut on the screw, means on one side of the flier frame for carrying a roll of tape, means for guiding said tape from the roll around the end of the flier frame to the guide.

19. In a device of the character described, the combination of a flier frame, means for carrying a supply of tape, means for guiding such tape to allow it to lie flatwise onto a cable joint about which the frame revolves, and a plurality of tension pins about which the tape may be diverted intermediate of the supply and guide.

20. In a device for winding insulating tape onto cable joints, the combination of a revoluble flier frame, means on one side thereof for carrying a supply of insulating tape, means on the other side for guiding said tape to the cable joint, the tape passing intermediately around the end of the flier frame, and a series of tension pins carried by the flier frame about which the tape may pass in various courses to supply variable tension.

21. In a device of the character described, the combination of a revoluble flier frame, a longitudinal screw carried thereby, a guide having a nut engaging the screw, means for carrying a supply of insulating tape on the flier frame, means for guiding said tape from the supply to the guide including a set of tension pins about which the tape may pass in various courses interchangeably.

22. A device for winding insulating tape over cable joints comprising a yoke adapted to be secured to the cable at two separate points and a flier frame revolubly mounted on the yoke and carrying the tape and swinging within the yoke.

23. In a device of the character described, the combination of a yoke having arms carrying sleeve-like members projecting toward each other and adapted to embrace the cable, and a flier frame rotatably mounted on said sleeve-like members and adapted to swing within the yoke.

24. In a device of the character described, the combination of a yoke having a pair of arms carrying split sleeves adapted to clamp about a cable, said sleeves projecting toward each other from said arms, a flier frame rotatably mounted on said sleeves, a traveling guide on the flier frame, and means on the flier frame for carrying a supply of tape which passes therefrom to the guide.

25. In a device of the character described, the combination of a yoke having a pair of split sleeve clamps, a flier frame rotatably mounted on said clamps, a split gear carried by one of said clamps, a screw carried by the flier frame and connected with said gear, and a traveling guide having a nut engaging the screw.

CLAUDE N. RAKESTRAW.
ALBERT R. ASKUE.